March 11, 1958    H. H. LE VEEN    2,826,169
REFLECTIVE HEAT INSULATING COATING FOR ANIMALS
Filed Jan. 21, 1954

INVENTOR
HARRY H. LE VEEN
BY
Curtis, Morris & Safford
ATTORNEYS

United States Patent Office 2,826,169
Patented Mar. 11, 1958

2,826,169

REFLECTIVE HEAT INSULATING COATING FOR ANIMALS

Harry H. Le Veen, Roswell, N. Mex.

Application January 21, 1954, Serial No. 405,365

6 Claims. (Cl. 119—1)

This invention relates to a method of protecting livestock from the effects of solar radiation and from the loss of body heat.

In warm climates it is difficult to raise certain varieties of livestock which are adversely affected by the heat. This is particularly true of dark-colored livestock because of the higher absorption of solar energy. For example, Aberdeen Angus cattle, which are black in color, ordinarily cannot withstand intense solar radiation because of the excessive rise in body temperature. Any rise in body temperature of livestock increases the metabolic rate and therefore increases the food consumption of the animal. Moreover, at cooler times of the year or in cooler climates, the livestock radiates a substantial amount of heat and this energy must be provided for by the metabolism of food. Thus when the rate of heat loss of the animal is high, the food intake must be greater in order to provide the additional heat energy. This extra food is particularly important in relatively arid country where only a small number of cattle may be grazed on a given amount of land.

Accordingly, the present invention is directed to increasing the efficiency of production of livestock such as cattle, sheep, goats, etc. More particularly the present invention is directed toward increasing the number of cattle or other livestock which may be grazed on a given area of land, by the reduction of heat absorption of livestock in hot weather, and by the reduction of radiation of body heat that occurs when the body temperature of the animal is above the temperature of the surrounding environment.

Figure 1:
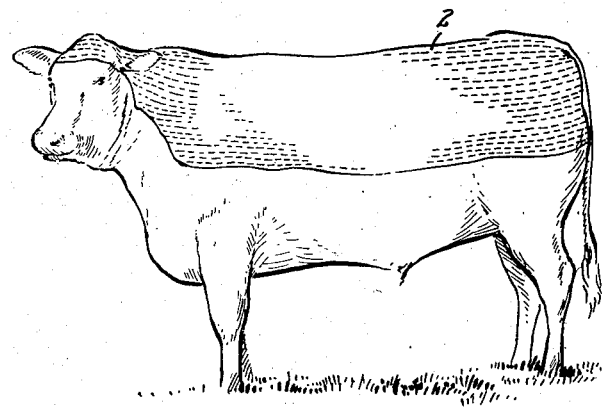
Figure 2:
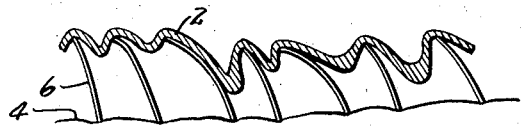

Figure 1 shows a steer treated in accordance with the present invention by coating the upper portion of the animal with an outer layer of heat-reflecting material 2; and Figure 2 is an enlarged diagrammatic sectional view showing the heat reflecting coating supported by the hairs of the animal.

The coating 2 is formed of organic material that is light in color and is applied to the animal in any desired manner as by spraying or the like. This coating 2 preferably forms a tent-like covering over the outside of the hair so that an air-space is provided between this outer covering and the hide of the animal.

This coating may be formed of an organic binder combined with any desired light-colored pigment that will reflect the heat of the sun's rays.

The binder for the coating may include cellulose materials such as ethyl cellulose, methyl cellulose, nitrocellulose, etc., gelatin, dextrin, polyvinyl alcohols, shellac, etc. The degree of water resistance required of the coating depends upon the climate in which the animals are to be grazed. In arid climates little water resistance is required and binders that are softened by or even soluble in water can be used.

Suitable solvents, depending upon the particular binder and conditions of application, include water, alcohols, ketones, aldehydes, ethers, esters, and petroleum solvents, etc.

Suitable plasticizers can be added to give the necessary flexibility to the coating. Such plasticizers may include tricresyl phosphate, dibutyl phthalate, glycerine, wax glycols, etc.

Any pigment of light color can be used such as zinc oxide, titanium, dioxide, calcium sulfate, metal particles, etc. Extra fine aluminum powder has been found particularly satisfactory.

A suitable formulation for arid and semi-arid areas is as follows:

| | |
|---|---|
| Polyvinyl alcohol | 1 pound. |
| Glycerine | 1½ ounces (vol.). |
| Distilled water | 1 gallon. |
| Octyl alcohol (or other suitable anti-foam agent) | ⅛ ounce (vol.). |
| Sodium nitrite (or other suitable reducing agent) | 1/16 ounce (vol.). |

The polyvinyl alcohol is dispersed in cold water with an agitator. After the dispersion is complete, the mixture is heated with constant stirring until all of the polyvinyl alcohol is dissolved. The other ingredients listed above are then added and to this solution is added ¾ pound of extra fine aluminum powder.

The polyvinyl alcohol sold by The DuPont Company under the trade designation "52-22" is suitable. The aluminum powder may be that sold by the Aluminum Company of America under the trade designation "Alcoa #422."

For more humid areas, a water insoluble partially hydrolized grade of polyvinyl alcohol is dissolved in an alcohol or alcohol-water mixture. The resulting mixture can be applied by spraying or other means.

Octyl alcohol or other suitable anti foam agents may be used. Sodium nitrite is used as a reducing agent to prevent darkening of the aluminum powder which may occur on storage.

These materials are suitable for use on sheep as the film is destroyed readily during the alkali scouring of the wool.

Gelatin or dextrin or the like can be substituted for the polyvinyl alcohol but the film formed with polyvinyl alcohol is superior.

More volatile solvents such as ethanol can be used to replace part or all of the water if rapid drying is desired.

Shellac also forms a suitable binder and is readily removed by the alkali scouring of wool. A suitable formulation is as follows:

| | |
|---|---|
| Shellac (dry resin) | 4 pounds. |
| Glycerine | 4 ounces (vol.). |
| Methanol | 1 gallon. |
| Aluminum powder | ¾ pound. |

The methanol which is used as a solvent for the shellac is somewhat toxic and it is desirable when using this material to spray only the body of the animal while protecting the head of the animal from the fumes, for example by using a shield of metal, canvas, wood or the like having an opening through which the head may be placed while the animal is being coated.

Other formulations can be devised based on chlorinated rubber, waxes, glue etc., but the ones set forth above are suitable and may be used for all different animals under widely varying climatic conditions.

The coating may be applied to the upper portion of the animal which is most directly exposed to the rays of the sun as indicated in Figure 1, or it may be applied to both the upper and lower portions of the body.

Under certain circumstances it may be adequate to coat only part of the animal. For instance in summer months it may be necessary to coat only the upper half of the animal. In the winter, the entire animal should be coated to avoid excessive heat loss during the long cold nights. It is also conceivable that under certain climatic conditions where the solar radiation may be intense and prolonged and yet ground remain frozen, it might be adequate to coat the under side of the animal only.

Figure 2 indicates diagrammatically the hide of an animal together with the hairs over which the coating 2 has been applied. It will be seen that the coating 2 is supported by the wool or hair of the animal and that an air-space is provided between the heat-reflecting coating 2 and the hide of the animal. This result is best achieved by using a high-pressure spray system for applying the coating and a formulation of material of such viscosity and film-forming characteristics as to be largely supported by the hairs. Other methods of application, such as dipping, however can be used. It is, of course, not essential that the film be supported entirely by the hair, as highly useful results are achieved even when the coating is in direct contact with the hide of the animal.

The present invention is of particular utility in hot, arid climates as for example in the southwestern part of the United States. The coating on the animals permits a larger number of animals to be grazed on a given amount of land, thus substantially reducing the cost of grazing the livestock. Moreover, the present invention makes it possible to graze breeds of live stock which because of color do not tolerate such hot, arid climates. It reduces the quantity of food which must be fed to animals which are being stabled or penned for feeding.

From the foregoing it will be seen that the invention is well-adapted to carry out the ends and objects hereinbefore set forth and that it can be uitlized to substantial economic advantage in large areas of the country. It is obvious that the present invention is not limited to the use of particular formulations of materials. The formulations set forth are merely given for the purpose of providing examples of suitable compositions. Combinations selected from many other resins, many other pigments and many other solvents are entirely suitable, the choice depending to some extent upon the particular conditions of use and application.

I claim:

1. In combination with a farm animal, a heat reflecting covering on at least the major portion of the outer surface of said animal, said covering being intimately adhered to the outer portions only of the animal's coat, leaving an insulating dead-air space between said covering and the animal's skin.

2. The combination claimed in claim 1 wherein said coating is formed predominately of polyvinyl alcohol.

3. The combination claimed in claim 1 wherein said coating is formed predominately of shellac.

4. The combination claimed in claim 1 wherein said coating contains a substantial proportion of aluminum particles.

5. The combination claimed in claim 2 where said coating includes the following materials in approximately the following relative proportions: One pound polyvinyl alcohol; 1½ ounces by volume glycerine; ⅛ ounce by volume octyl alcohol; 1/16 ounce by volume sodium nitrite; one gallon water; and ¾ pound aluminum powder.

6. The combination claimed in claim 2 where said coating includes the following materials in approximately the following relative proportions: One pound polyvinyl alcohol; 1½ ounces by volume glycerine; ⅛ ounce by volume octyl alcohol; 1/16 ounce by volume sodium nitrite; one gallon water; and ¾ pound aluminum powder; 4 ounces by volume glycerine; one gallon methanol; and ¾ pound aluminum powder.

References Cited in the file of this patent

UNITED STATES PATENTS

| | | |
|---|---|---|
| 1,398,381 | Laacke | Nov. 29, 1921 |
| 1,553,632 | Rieck | Sept. 15, 1925 |
| 2,175,213 | Parsons | Oct. 10, 1939 |
| 2,327,899 | Isermann et al. | Aug. 24, 1943 |
| 2,688,311 | Pierce | Sept. 7, 1954 |